Mar. 27, 1923.
A. H. NEULAND
DYNAMO ELECTRIC MACHINE
Filed Aug. 21, 1920
1,449,539
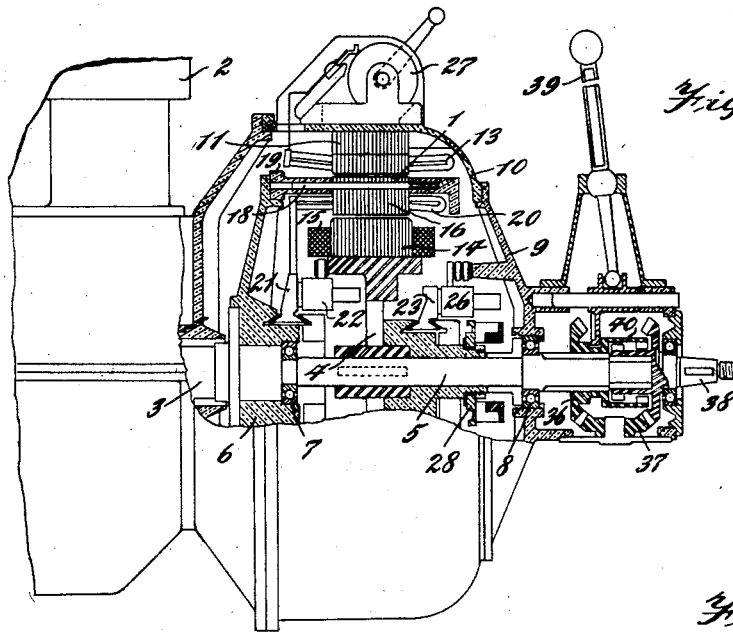
Fig. 1.
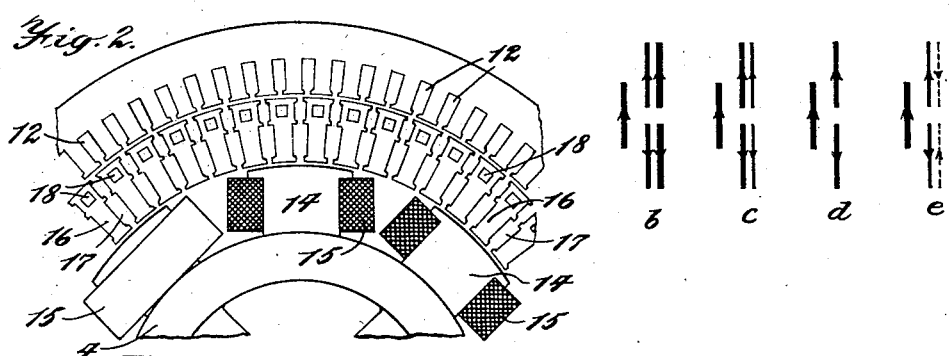
Fig. 2.
Fig. 4.
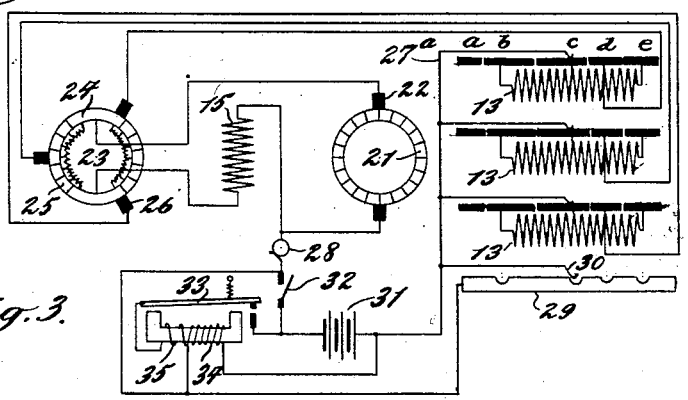
Fig. 3.
INVENTOR
Alfons H. Neuland
BY
Rosenbaum, Stockbridge & Borst
ATTORNEY Patented Mar. 27, 1923.

1,449,539

UNITED STATES PATENT OFFICE.

ALFONS H. NEULAND, OF JERSEY CITY, NEW JERSEY.

DYNAMO-ELECTRIC MACHINE.

Application filed August 21, 1920. Serial No. 404,998.

*To all whom it may concern:*

Be it known that I, ALFONS H. NEULAND, a citizen of Russia, residing at Jersey City, in the county of Hudson and State of New Jersey, have invented certain new and useful Improvements in Dynamo-Electric Machines, of which the following is a full, clear, and exact description.

My present invention relates to electromagnetic transmissions for use in automobiles and wherever the speed of a prime mover is to be changed or adjusted with a corresponding change in torque.

The object of my invention is to provide a transmission of light weight and high power to meet the present tendency towards lighter automobile construction.

Another object is to provide for a simplified construction and control.

A still further object is to provide for a special reversing gear to operate in conjunction with the electric transmission.

Still other objects will appear in the following description.

In transmissions intended for a similar purpose it is the usual practice to vary the speed by varying the strength of the field. It is known that the current, for a given torque increases as the field is weakened with the result that, aside from the commutation difficulties, the machine must carry heavy currents, making it inefficient, or the size of the machine must be increased making it heavy.

In my present invention I maintain the full strength in a rotatable field element under all conditions, thereby insuring light weight, and in order to change the speed and torque relations between the driving or primary member and the driven or secondary element I employ a split armature winding. Of the two parts of the winding, one part is arranged to rotate and is connected to a commutator, while the other part is stationary but is so arranged with relation to the rotating part that the currents in both are in phase with each other, and in this way the sum of or the difference between the two forces act upon the field element.

In this way by varying the turns in series of the stationary armature, or by leaving the stationary winding out of circuit, or by reversing a part of the stationary winding, I am able to vary the speed and torque relation between the rotating armature and the rotating field element. Such manipulation is made possible by the commutating arrangement and the series relation between the field winding, the rotating armature winding and the stationary armature winding, as well as by the special construction of the rotating armature and the arrangement of the elements with respect to each other so that they are acted on and traversed by a common magnetic flux.

I will now describe the particular embodiment of my invention which I have selected for illustration in the drawings, of which:

Fig. 1 is a longitudinal section through the transmission, reversing gear and controller.

Fig. 2 is a partial transverse section showing particularly the shape of the armature laminations.

Fig. 3 is a diagrammatic representation of the electric circuits and the commutating arrangement of the machine.

Fig. 4 is a representation of the relative strength, position and direction of the currents in the respective elements with the controller in the several positions.

The transmission as illustrated in the drawings is particularly adapted to automobiles, in that armature 1 is the driving or primary member and serves as the fly-wheel for the internal combustion engine 2 and is rigidly connected to the crank shaft 3. The field element 4 is the secondary or driven member and is connected to the propeller shaft 5 which is supported at one end by the armature spider 6 through the ball bearing 7, and is supported at its other end by the ball bearing 8 held in place by the stationary bracket 9. Secured to the housing 10 is the stationary armature element consisting of a laminated ring 11 provided on its inner face with slots 12 in which is lodged the distributed winding 13.

There are eight pole-pieces 14 on the field element, each carrying a field coil 15. The field element is in inductive relation to the rotating and stationary armatures, and the two armatures may be said to be in cooperative relation in their action upon the field element, it being of particular importance to note that the field element is in inductive relation to the stationary armature, even though they are separated by the rotating armature. This is due to the special construction of the rotating armature, which is built up of laminated sectors 16 separated from each other by the spaces 17, which cause the flux to pass through the armature radially and minimize the circumferential flux leakage. The sectors are so shaped as to form coil receiving slots on the inner face of the armature and each is provided with a hole at the outer face fitting over the metal rods 18; the rods are solidly pressed into the ring 19, preferably broached square to prevent twisting.

At the inner face of the rotating armature 1 and lodged in the slots is the winding 20 connected to the commutator 21. Direct current brushes 22 attached to and rotating with the field element wipe the commutators 21.

Rotating with the field element and fastened thereto is the commutator 23. This commutator is of special construction and has one wide segment 24 per pole. Between each two of the wide segments are a plurality of narrower segments 25, and a suitable resistance connects the adjacent segments, as shown in the diagram of Fig. 3, in which, for the sake of simplicity, the commutator 23 is shown as for a two pole machine. This field commutator is wiped by stationary polyphase brushes 26, preferably three phase.

As shown in the diagram of Fig. 3, one of the D. C. brushes 22 revolving with the field connects to the wide segment 24. The other D. C. brush connects to the slip ring 28 and one end of the field winding 15; the other end of the field winding connects to the remaining wide segment.

It will be noted that aside from the stationary armature winding and the field commutator, the field element and D. C. armature virtually represent the well known clutch. In the field commutator the resistances connecting the wide segments with those adjacent are low, while those further away from the wide segments are increasingly greater, so that when the leads connecting to the stationary brushes 26 are disconnected from the winding 13, the field and rotating armature circuit is practically open, only a negligible current circulates, and consequently only a negligible torque is transferred from one to the other. A controller 27 is preferably attached to the transmission housing and serves to close the stationary polyphase brushes 26 through each of the three phases of the winding 13 by means of the contacts $b, c, d, e$.

With the controller in position so that the short circuiting bar 27$^a$ connects with contacts $a$, the brushes 26 are open circuited. With the bar on contacts $b$ the main circuit is closed and the current traverses in series relation the rotating armature, the field and the stationary armature windings, and as shown in the corresponding representation $b$ of Fig. 4, the magneto-motive force of the stationary armature is in phase with that of the rotating armature; the sum of the two forces acting upon the field and producing the maximum torque. Assuming the stationary armature, in this instance, to have twice as many turns in series as the rotating armature, the torque of the driven or field element will be three times that of the armature or driving element. It will be noted therefore that when the maximum torque is demanded all the windings in the machine are active and the field winding, being in series with the armatures, is traversed by the full current in the main circuit and therefore produces a powerful flux with the result that great power and a heavy torque is produced with moderate currents.

When the controller is moved to the position $c$ some of the turns of the stationary winding are cut out with the result that the counter electro-motive force due to the rotation of the field with respect to the stationary winding, with which the field is in inductive relation, is reduced; this causes the field to speed up and the torque upon the field is naturally decreased in proportion.

The step $d$ is direct drive; that is the entire stationary winding is cut out and the stationary brushes 26 are short circuited upon themselves so that the device operates as an ordinary D. C. clutch where the full torque of the prime mover is directly transferred to the driven element at nearly the same speed.

It is often desirable to operate a driven shaft or element in excess of that of the prime mover. This in the present invention is accomplished on step $e$ where a portion of the stationary armature winding is reversed against the rotating armature winding as shown in the corresponding representation $e$ in Fig. 4.

The effect of this, although of course still further reducing the torque on the field or driven element, generates, in this stationary winding, not a counter potential as before but a positive potential which maintains the current in the circuit even though the speed of the driven exceeds the speed of the driving element.

To prevent sparking at the controller contacts when shifting it from one position to the other, provision is made to short circuit the field winding by means of the notched metal strip 29 and the contact finger 30 which short circuits the field winding through the stationary brushes 26 on the one side, and the slip ring 28 on the other. When the controller is moved, the field winding is immediately short circuited and kept shorted until contact is fully made on the next step whereupon the field winding is opened and the machine instantly picks up and maintains the newly established relations.

Provision is made to use the transmission as a starter for the prime mover by means of the battery 31, and provision is also made to charge the battery by the transmission. When the starting switch 32 is closed the current passes to the slip ring 28, thence to the rotating armature and field windings in multiple relation, reversing the current through the armature and causing the armature to crank the engine in a forward direction, and the current then reaches the field commutator, the stationary polyphase brushes, then the bar 27$^a$, preferably through the contacts $d$ and so back to the other terminal of the battery.

The battery is charged and connected in circuit by means of the automatic switch 33, which closes the circuit when a predetermined current has been reached in the main circuit and the corresponding drop has been reached across the circuit including the field, commutator, stationary brushes and stationary winding, when in circuit. The diagrams show one end of the switch shunt winding 34 connecting to the field winding while the other connects to the short circuit bar 27$^a$. The series winding 35 on the switch serves to open the switch and disconnect the battery each time the controller position is changed and the bar 29 comes into action, to prevent a flow of battery current during such short circuit. This is due to the fact that the series winding 35 and the shunt winding 34 are oppositely wound on the magnet and consequently when the short circuit bar 29 comes into action, the current in the series winding 35 reverses killing the flux in the magnet and permitting the retractile spring to open the switch.

The short circuit bar 29, when moved slightly from the operating positions, also serves to virtually instantly stop the flow of torque from the engine to the driven element without the necessity of bringing the controller into the off position at A.

In some instances it may be preferred to drive the field element, the rotating armature serving as the driven or secondary element. In such event, however, it is not practicable to obtain a torque on the driven element in excess of the driving element. The direct drive, as shown by step $d$, then produces the greatest torque and lowest speed, that is, practically a 1 to 1 ratio of torque and speed; the inclusion of the stationary windings then serve to increase the speed to double, triple or more above the driver or field, with a corresponding diminution in the driven torque. This is because the driving field element exerts a torque on the rotating armature and also a torque on the stationary armature winding, generating a potential in the latter which causes the armature to rotate at a speed exceeding that of the driving field element, so that with as many turns on stationary armature as on rotating armature the latter will rotate at about twice the speed of the field element.

The shaft 5 extends beyond the transmission bearing 8 and is splined to receive the sliding bevel gear 36 engaging, when in position for reverse, the idler gear 37 causing the stub shaft 38 to rotate in reverse direction. When the lever 39 is brought to the right, the gear 36 is disengaged from the idler 37 and the clutch 40 connects the driven shaft 5 directly to the shaft 38 for forward rotation.

It is obvious that various modifications may be made in the construction shown in the drawings and above particularly described within the principle and scope of my invention.

I claim:

1. A dynamo-electric machine comprising a rotative armature including a commutator and a winding connected to the commutator, a field member rotative independently of the armature and including a commutator and a winding connected to the commutator, a set of rotative brushes wiping one commutator, and a set of stationary brushes wiping the other commutator.

2. A dynamo-electric machine comprising a stationary auxiliary winding, a rotative armature winding, a rotative field member including a winding inductively related to both armature windings, and means for connecting the three windings in series comprising a rotative commutator for each of said rotative elements, a set of stationary brushes wiping one of the commutators, and a set of rotating brushes wiping the other commutator.

3. A dynamo-electric machine comprising a rotative armature winding including a commutator, a rotative field member including a commutator and a winding inductively related to the armature winding, a direct current connection including a brush carried by the field member and wiping the armature commutator closing a point of the armature winding with a point of the field winding, and an alternating current connection including a stationary brush wiping the field member commutator closing a second point of the armature winding with a second point of the field winding.

4. An electro-magnetic power transmission device comprising a rotative field member including a commutator and a winding connected to the commutator, stationary brushes wiping the commutator, a stationary armature element including a winding inductively related to the field winding and connected to the stationary brushes, a rotative armature element including a commutator and a winding inductively related to the field winding, and brushes wiping the last named commutator rotative with and connected to the field winding and to the first named commutator, respectively.

5. An electro-magnetic power transmission device comprising a stationary armature winding, a rotative armature including a winding and a commutator and a rotative field member including a commutator and a winding inductively related to both armature windings, a direct current connection between the field and rotative armature windings including a brush carried by the field member and wiping the armature commutator, and an alternating current connection between the field and stationary armature windings including a stationary brush wiping the field commutator.

6. A dynamo-electric machine comprising a rotative armature including a commutator and winding, a rotative field member including a commutator and winding, a stationary armature provided with a winding, a set of rotative brushes wiping one commutator, a set of stationary brushes wiping the other commutator, means connecting the two sets of brushes and the stationary armature winding in series, and means for varying the turns in series in the stationary armature winding.

7. An electro-magnetic power transmission device comprising a stationary armature winding, a rotative armature including a commutator and a winding adjacent to the stationary armature winding, and a rotative field member including a commutator and a winding inductively related to both armature windings, a direct current connection between the field and rotative armature windings including brushes carried by the field member and wiping the armature commutator, an alternating current connection between the field and stationary armature windings including stationary brushes wiping the field commutator, and means for varying the turns in series in the stationary armature winding.

8. An electro-magnetic power transmission device comprising a rotative field member including a commutator and a winding connected to the commutator, stationary brushes wiping the commutator, a stationary armature element including a winding inductively related to the field winding and connected to the stationary brushes, a rotative armature element including a commutator and a winding inductively related to the field winding, brushes wiping the last named commutator rotative with and connected to the field winding and to the first named commutator, respectively, and means for varying the turns in series in the stationary armature winding.

9. An electro-magnetic power transmission device comprising a rotative field member including a commutator and a winding connected to the commutator, stationary brushes wiping the commutator, a stationary armature element including a winding inductively related to the field winding and connected to the stationary brushes, a rotative armature element including a commutator and a winding inductively related to the field winding, brushes wiping the last named commutator rotative with and connected to the field winding, and to the first named commutator, respectively, means for varying the turns in series in the stationary armature winding, and means for reversing a part of the stationary armature winding with respect to the rotative armature winding.

10. An electro-magnetic power transmission device comprising a rotative field member including a commutator and a winding connected to the commutator, stationary brushes wiping the commutator, a stationary armature element including a winding inductively related to the field winding and connected to the stationary brushes, a rotative armature element including a commutator and a winding inductively related to the field winding, brushes wiping the last named commutator rotative with and connected to the field winding and to the first named commutator, respectively, a manipulative controller operative to vary the turns in series in the stationary winding, and means for short circuiting the field winding when shifting the controller from one operative position to another.

11. An electro-magnetic power transmission device comprising a rotative field member including a commutator and a winding connected to the commutator, stationary brushes wiping the commutator, a stationary armature element including a winding inductively related to the field winding and connected to the stationary brushes, a rotative armature element including a commutator and a winding inductively related to the field winding, brushes wiping the last named commutator rotative with and connected to the field winding and to the first named commutator, respectively, a manipulative controller operative to vary the turns in series in the stationary winding, means for short circuiting the field winding when shifting the controller from one operative position to another, a storage battery, means for connecting the battery with the rotative armature for charging, and automatic means for interrupting the battery circuit when the field winding is short circuited.

12. A dynamo-electric machine comprising a rotative field winding, a stationary armature winding, a rotative armature winding adjacent to the stationary winding and means including one set of rotative brushes and a commutator and one set of stationary brushes and a second commutator for connecting the three windings in series relation, the brushes being so arranged on the commutators that the currents in the armatures are kept in phase with each other and in electrical quadrature with the field force.

13. A dynamo-electric machine comprising a rotative field winding, a stationary armature winding, a rotative armature winding adjacent to the stationary winding, and means including a commutator for the field winding with stationary brushes and a commutator for the rotative armature winding with rotative brushes for connecting the three windings in series relation, the brushes being so arranged on the commutators that the currents in the two armatures are kept in phase with each other and in electrical quadrature with the field force.

14. An electro-magnetic clutch comprising a rotative armature winding with commutator, a rotative field and winding including brushes wiping said commutator, a connector between the field and armature windings, a commutator for said field, a plurality of connectors between the two windings and the last named commutator and stationary brushes wiping the field commutator and serving to close the field and armature windings in series relation.

15. A dynamo electric machine comprising a rotative field member including a winding and a commutator, a rotative armature including a commutator and brushes wiping the armature commutator carried by the field member, the field commutator having a wide segment for each pole separated by narrow segments and one end of the field winding being connected to alternate wide sections and the other end to one of the rotative brushes on the armature commutator while the other rotative brush is connected to the intermediate alternate wide segments, and resistances connecting the adjacent wide segments and intermediate narrow segments.

16. A dynamo-electric machine comprising a rotative field winding, a stationary armature winding, a rotative armature winding adjacent to the stationary winding and means including one set of rotative brushes and a commutator and one set of stationary brushes and a second commutator for connecting the three windings in series relation, the brushes being so arranged on the commutators that the two armature forces are kept in phase with each other and in electrical quadrature with the field force, and resistances for the second commutator varying progressively from the wide segments to the intermediate narrow segments.

In witness whereof, I hereunto subscribe my signature.

ALFONS H. NEULAND.